United States Patent
Kuyper-Hammond et al.

(10) Patent No.: US 8,763,906 B2
(45) Date of Patent: *Jul. 1, 2014

(54) ENHANCED-DENSITY BARCODE

(75) Inventors: Michael Peter Kuyper-Hammond, Kaltbrunn (CH); Michael Charles Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,829

(22) Filed: Aug. 9, 2012

(65) Prior Publication Data

US 2012/0298745 A1 Nov. 29, 2012

Related U.S. Application Data

(63) Continuation of application No. 12/366,857, filed on Feb. 6, 2009, now Pat. No. 8,267,321.

(30) Foreign Application Priority Data

Feb. 11, 2008 (EP) .................................... 08101467

(51) Int. Cl.
*G06K 7/10* (2006.01)

(52) U.S. Cl.
USPC ................... 235/456; 235/462.09; 235/462.1; 235/462.25; 235/462.4

(58) Field of Classification Search
USPC .............. 235/456, 460, 462.1, 462.4, 462.09, 235/462.25, 472
See application file for complete search history.

(56) References Cited

U.S. PATENT DOCUMENTS

| | | | |
|---|---|---|---|
| 5,153,418 A | 10/1992 | Batterman | |
| 5,416,311 A | 5/1995 | Kyriazis | |
| 5,454,054 A | 9/1995 | Iizuka | |
| 5,514,858 A | 5/1996 | Ackley | |
| 5,770,847 A | 6/1998 | Olmstead | |
| 6,005,582 A | 12/1999 | Gabriel | |
| 6,032,861 A | 3/2000 | Lemelson | |
| 6,398,117 B1 | 6/2002 | Oakeson | |
| 6,616,039 B1 | 9/2003 | Saporetti | |
| 7,175,090 B2 | 2/2007 | Nadabar | |
| 8,267,321 B2 * | 9/2012 | Kuyper-Hammond et al. | ........................ 235/462.09 |
| 2001/0050308 A1 | 12/2001 | Paul | |

* cited by examiner

*Primary Examiner* — Michael G Lee
*Assistant Examiner* — Tabitha Chedekel
(74) *Attorney, Agent, or Firm* — Gail H. Zarick; Otterstedt, Ellenbogen & Kammer, LLP

(57) ABSTRACT

A method of decoding a two-dimensional enhanced-density barcode. A first and a second barcode are encoded in the enhanced-density barcode. The enhanced-density barcode includes a set of blocks. Each block includes a predefined number of sub-pixels. The blocks of the enhanced-density barcode being arranged relatively to each other in a geometrical lattice having a first and a second lattice direction. The method includes the steps of distorting of the enhanced-density barcode in the first lattice direction, resulting in a first distorted barcode, distorting of the enhanced-density barcode in the second lattice direction, resulting in a second distorted barcode, reconstructing the first barcode by low-pass filtering the first distorted barcode, reconstructing the second barcode by low-pass filtering the second distorted barcode.

4 Claims, 4 Drawing Sheets

ENHANCED-DENSITY BARCODE

CROSS-REFERENCE TO RELATED APPLICATION

This application claims priority, under 35 U.S.C. §119, from European Patent Application No. 08101467.2 filed Feb. 11, 2008, the entire contents of which are incorporated herein by reference. This application is a continuation of U.S. patent application Ser. No. 12/366,857 filed Feb. 6, 2009, the entire contents of which are incorporated herein by reference.

BACKGROUND OF THE INVENTION

1. Field of the Invention

The present invention relates to a method of decoding a two-dimensional enhanced-density barcode, a method of encoding a two-dimensional enhanced-density barcode, a barcode reader for reading a two-dimensional enhanced-density barcode and a two-dimensional enhanced-density barcode.

2. Description of Related Art

Two-dimensional (2D) barcodes, widely used to encode binary information on surfaces, have information density limits due to resolution limitations of reading equipments. For applications where the available encoding surface may be scaled according to the data requirements this does not cause a problem. However, for applications that have a limited encoding space this restricts the amount of usable data that may be stored. One such example is a standard ID-1 form driving license according to the ISO/IEC standard 18013-1 of the International Standard Organization (ISO) that is required to carry a 2D barcode containing an image of the cardholder. The space available for encoding a 2D barcode is limited which restricts the size of the image that can be stored which means that only low resolution images can be used.

SUMMARY OF THE INVENTION

The present invention is directed to a method for decoding, a method for encoding, a barcode reader and an enhanced-density barcode.

According to a first aspect of the invention there is provided a method of decoding a two-dimensional enhanced-density barcode, wherein a first and a second barcode are encoded in the enhanced-density barcode. The enhanced-density barcode includes a set of blocks, each block including a predefined number of sub-pixels. The blocks of the enhanced-density barcode are arranged relative to each other in a geometrical lattice, which has a first and a second lattice direction. The method includes the steps of: distorting the enhanced-density barcode in the first lattice direction, resulting in a first distorted barcode; distorting the enhanced-density barcode in the second lattice direction, resulting in a second distorted barcode; reconstructing the first barcode by low-pass filtering the first distorted barcode; and reconstructing the second barcode by low-pass filtering the second distorted barcode.

According to a second aspect of the invention there is provided a barcode reader for reading a first and a second barcode from a two-dimensional enhanced-density barcode, wherein the first and the second barcode are encoded in the two-dimensional enhanced-density barcode, the enhanced-density barcode including a set of blocks, each block including a predefined number of sub-pixels, the blocks of the enhanced-density barcode being arranged relatively to each other in a geometrical lattice, the lattice having a first and a second lattice direction, the reader including a component for distorting the enhanced-density barcode in the first lattice direction, resulting in a first distorted barcode, a component for distorting the enhanced-density barcode in the second lattice direction, resulting in a second distorted barcode, a component for reconstructing the first barcode by low-pass filtering the first distorted barcode, a component for reconstructing the second barcode by low-pass filtering the second distorted barcode.

According to a third aspect of the invention there is provided method of encoding a two-dimensional enhanced-density barcode, the method including the steps of receiving a first and a second barcode, the first and the second barcode including pixels of a predefined pixel density, performing a pair wise encoding of pixel pairs of the first and the second barcode according to a predefined encoding scheme, wherein the predefined encoding scheme allocates to each combination of pixel pairs a predefined block including a predefined number of sub-pixels, wherein the blocks of the enhanced-density barcode are arranged relatively to each other in a geometrical lattice, the lattice having a first and a second lattice direction.

According to a fourth aspect of the invention there is provided two-dimensional enhanced-density barcode, wherein a first and a second barcode are encoded in the two-dimensional enhanced-density barcode by means of a predefined encoding scheme, wherein according to the predefined encoding scheme each combination of pixel pairs of the first and the second barcode is mapped on a predefined block including a predefined number of sub-pixels, wherein the blocks of the enhanced-density barcode are arranged relatively to each other in a geometrical lattice, the lattice having a first and a second lattice direction.

Any of the features of one aspect of the invention may apply to the other aspects of the invention. Advantages of the features of one aspect of the invention may apply to the other aspects of the invention.

BRIEF DESCRIPTION OF THE DRAWINGS

The following preferred embodiments of the invention will be described in detail by way of example only making reference to the drawings in which.

DETAILED DESCRIPTION

Figure 1:
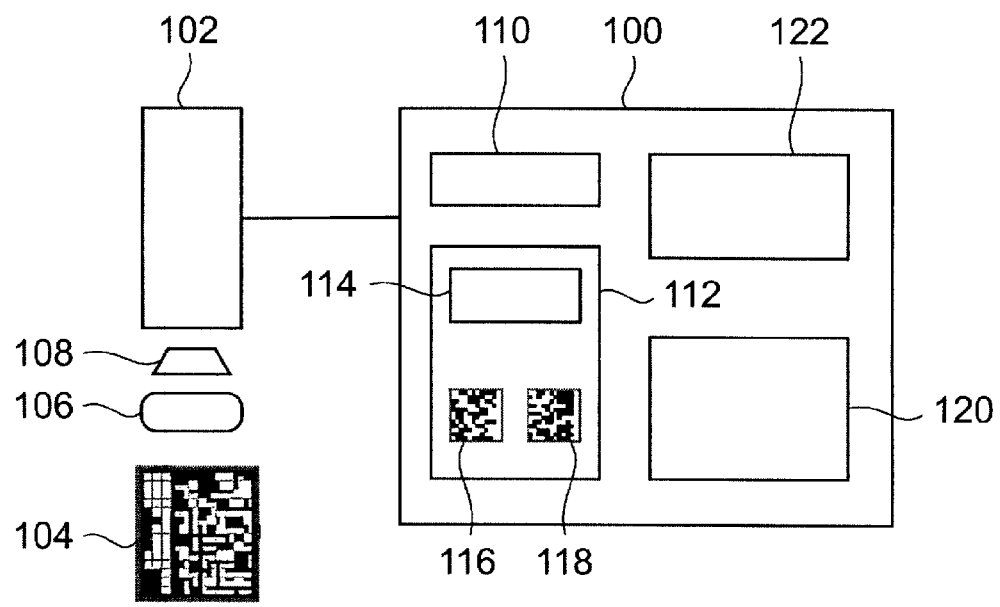
FIG. 1: is a block diagram of a barcode reader.

According to a first aspect of the invention there is provided a method of decoding a two-dimensional enhanced-density barcode, wherein a first and a second barcode are encoded in the enhanced-density barcode, the enhanced-density barcode including a set of blocks, each block including a predefined number of sub-pixels, the blocks of the enhanced-density barcode being arranged relatively to each other in a geometrical lattice, the lattice having a first and a second lattice direction, the method including the steps of distorting of the enhanced-density barcode in the first lattice direction, resulting in a first distorted barcode, distorting of the enhanced-density barcode in the second lattice direction, resulting in a second distorted barcode, reconstructing the first barcode by low-pass filtering the first distorted barcode, and reconstructing the second barcode by low-pass filtering the second distorted barcode.

The method according to this aspect of the invention has the advantage that the effective data rate of a barcode can be increased by combining several low resolution images into a single, high resolution barcode. Individual components can be reconstructed from the combined image using distortion and low pass filtering steps such that, after applying the distortion and the filtering steps, scanning equipment can be used to read the first and the second barcode from the enhanced-density barcode. High resolution digital processing can be used to combine the first and the second lower resolution barcodes. An encoded output may consist of low frequency areas where constituent barcode pixels are identical and high frequency regions where the corresponding pixels differ. High frequency pixel encoding may rely on features finer than the effective resolution of the scanning equipment. Nevertheless, by performing the distortion and filtering steps according to the embodiments of the invention, low resolution scanning equipment can be used to decode and extract the first and the second barcode encoded in the enhanced-density barcode.

The terms blocks and sub-pixels have to be broadly understood as general terms covering all kinds of geometrical shapes like rectangles, squares, circles, polygons etc.

An enhanced-density barcode is understood as a barcode that has a higher density than the first and the second barcode. In other words, the enhanced-density barcode can store or represent more information than the single first and second barcode.

According to an embodiment of the invention the enhanced-density barcode can store the information of the first and the second barcode together on an area sufficient to store the larger of them.

A two-dimensional barcode is a barcode in which data is encoded in two dimensions, e.g. a horizontal and vertical dimension.

According to an embodiment of the first aspect of the invention the distorting of the enhanced-density barcode in the first lattice direction results in a distortion of a first group of sub-pixels in the first lattice direction, the distortion of the first group of sub-pixels in the first lattice direction extending from the respective sub-pixels of the first group to the sub-pixels adjacent in the first lattice direction. Furthermore, the distorting of the enhanced-density barcode in the second lattice direction results in a distortion of the first group of sub-pixels in the second lattice direction, the distortion of the first group of sub-pixels in the second lattice direction extending from the respective sub-pixels of the first group to the sub-pixels adjacent in the second lattice direction.

According to an embodiment of the first aspect of the invention the first group of sub-pixels consists of sub-pixels of a first predefined colour. The predefined colour is preferably a dark colour, in particular black. Such a colour can be distorted in an efficient way. The second group of sub-pixels has a different colour than the first group of sub-pixels, preferably a light colour such as white. Such a colour will not be distorted or substantially not distorted.

In accordance with an embodiment of the invention, the first and the second lattice direction are perpendicular to each other. However, in general the first and the second lattice direction can have any arbitrary orientation relative to each other.

According to an embodiment of the invention the distorting in the first lattice direction results in a smearing of the sub-pixels of the first group of sub-pixels in the first lattice direction and the distorting in the second lattice direction results in a smearing of the sub-pixels of the first group of sub-pixels in the second lattice direction.

Such a smearing performs an anisotropic transformation of the enhanced-density barcode. The smearing process distorts sub-pixels of the first group of sub-pixels, in particular dark sub-pixels, thereby creating a lighter, but observable "shadow" that darkens neighboring light pixels in the direction of smearing. Such smearing does not lighten sub-pixels and only dark sub-pixels of the first group of sub-pixels influence and spread over to adjacent light sub-pixels. In other words, dark sub-pixels of the first group of sub-pixels generate an observable shadow. Preferably the shadow, i.e. the distorting influence, does not exceed a sub-pixel distance. According to an embodiment of the invention the shadow has substantially the width of one sub-pixel.

In accordance with a further embodiment of the invention, the distorting is performed by anisotropic filtering. In general, the distorting and/or the low pass filtering are performed optically or digitally. However, preferably the distorting and the low pass filtering are performed optically since in this case low resolution scanning equipment can be used which just reads the decoded analogue optically decoded first and second barcode.

In accordance with an embodiment of the invention, the barcode axis of the first barcode corresponds to the barcode axis of the second barcode, wherein the first and the second lattice direction correspond to the barcode axis of the first and the second barcode.

In accordance with an embodiment of the invention, the method further includes reconstructing the first and the second lattice direction. For example, the reconstruction is performed by analyzing special alignment patterns included in the enhanced-density barcode. Such alignment patterns may be given by additional predefined sub-pixel arrangements and/or additional grid lines included in the enhanced-density barcode. This simplifies the locating of the first and the second lattice direction and prevents a wrong reconstruction of the first and second lattice direction. Furthermore, this reduces the error proneness.

According to an embodiment of the invention the low-pass filtering of the first and the second distorted barcode is adapted to colour-average the sub-pixels of the blocks to pixels of the first and the second barcode respectively.

Preferably, reconstructing the first and the second barcode further includes determining the block boundaries of the blocks. Once block boundaries have been determined, the low pass filtering is adapted such to transform the block contents by color-averaging to, for example, a single black or a single white pixel value, which can then be used as a single pixel of the first or the second barcode. Low pass filtering may be implicit if the scanning equipment does not have sufficient resolution to oversample the image. In this case, pixels of the first and the second barcode are reconstructed from a single reading combining the luminosity of an entire block. However, with sufficient high resolution scanning equipment, several readings from the same block will be averaged to a single binary value. In both cases, the sub-pixels included in a block will be reduced to a single pixel reading.

According to an embodiment of the invention the reconstructing is adapted to interpret a colour value below a predetermined threshold as a first block colour and above the predetermined threshold as a second block colour.

In case of a black and white barcode, a color value above the threshold would be interpreted as black block color and hence reconstructed to a black pixel of the first or the second barcode respectively. A color value below the threshold would be interpreted as a white block color and hence reconstructed to a white pixel of the first or the second barcode respectively.

As an example, the threshold could be defined by 55% black/dark sub-pixels. Accordingly, if a block of four sub-pixels comprises 3 or 4 black/dark sub-pixels, it would be color-averaged to a black/dark pixel. If a block of four sub-pixels comprises 2, 1 or zero black/dark sub-pixels (corresponding to 2, 3 or 4 white/light sub-pixels), it would be color-averaged to a white/light pixel. According to an embodiment of the invention the predetermined threshold is understood as predetermined darkness, e.g. a darkness of 55%. The exact thresholds may be selected based on knowledge of the distortion or smearing process.

In accordance with an embodiment of the invention, the block boundaries are determined by analyzing the alignment patterns. By using the alignment patterns to determine the block boundaries, blocks can be accurately determined which may further reduce the error proneness. Furthermore, special analysis and correction algorithms to determine block boundaries can be avoided which simplifies the technical design of scanning equipment.

In accordance with an embodiment of the invention the sub-pixel density of the enhanced-density barcode is higher than the pixel density of the first and/or the second bar code. This has the advantage that within a given spatial area more information can be encoded.

According to a second aspect of the invention there is provided a barcode reader for reading a first and a second barcode from a two-dimensional enhanced-density barcode, wherein the first and the second barcode are encoded in the two-dimensional enhanced-density barcode, the enhanced-density barcode including a set of blocks, each block including a predefined number of sub-pixels, the blocks of the enhanced-density barcode being arranged relatively to each other in a geometrical lattice, the lattice having a first and a second lattice direction, the reader including a component for distorting the enhanced-density barcode in the first lattice direction, resulting in a first distorted barcode, a component for distorting the enhanced-density barcode in the second lattice direction, resulting in a second distorted barcode, a component for reconstructing the first barcode by low-pass filtering the first distorted barcode, a component for reconstructing the second barcode by low-pass filtering the second distorted barcode.

The components for distorting and low-pass filtering are preferably optical components and/or digital components.

According to an embodiment of the invention the barcode reader includes a component for reconstructing the first and the second lattice direction.

According to a third aspect of the invention there is provided method of encoding a two-dimensional enhanced-density barcode, the method including the steps of receiving a first and a second barcode, the first and the second barcode including pixels of a predefined pixel density, performing a pair wise encoding of pixel pairs of the first and the second barcode according to a predefined encoding scheme, wherein the predefined encoding scheme allocates to each combination of pixel pairs a predefined block including a predefined number of sub-pixels, wherein the blocks of the enhanced-density barcode are arranged relatively to each other in a geometrical lattice, the lattice having a first and a second lattice direction.

According to a fourth aspect of the invention there is provided two-dimensional enhanced-density barcode, wherein a first and a second barcode are encoded in the two-dimensional enhanced-density barcode by means of a predefined encoding scheme, wherein according to the predefined encoding scheme each combination of pixel pairs of the first and the second barcode is mapped on a predefined block including a predefined number of sub-pixels, wherein the blocks of the enhanced-density barcode are arranged relatively to each other in a geometrical lattice, the lattice having a first and a second lattice direction.

According to an embodiment of this aspect of the invention the sub-pixel density of the enhanced-density barcode is four times higher than the pixel density of the first and the second barcode. In other words, each pixel pair established by a pixel of the first barcode and a pixel of the second barcode is mapped on a block consisting of four sub-pixels. Each block of the enhanced-density barcode has the size of one single pixel of the first barcode and the second barcode respectively.

FIG. 1 is a block diagram of a barcode reader. The barcode reader includes a scanner 102 and a data processing system 100. The barcode reader further includes a component for low pass filtering and a component for distorting an enhanced-density barcode 104. The data processing system 100 includes a processor 110 and a memory 112, such as a hard disc or a random access memory (RAM). The data processing system 100 further includes a display 120 and an interface 122. By means of the interface 122, the data processing system 100 is coupled to the scanner 102 and can also control an alignment of the component for distorting 106 relative to the enhanced-density barcode 104.

Such an alignment of the component for distorting 106 relative to the enhanced-density barcode 104 is used since the enhanced-density barcode 104 includes a first 116 and a second 118 barcode which are encoded in the enhanced-density barcode 104. The enhanced-density barcode 104 includes blocks that are arranged relative to each other in a geometrical lattice, wherein the component for distorting 106 is used to distort each block of the set of blocks of the enhanced-density barcode 104 in a first and a second direction. These directions are given by the lattice directions of the geometrical lattice. Each block of the enhanced-density barcode 104 includes four sub-pixels.

For example, the enhanced-density barcode 104 is illuminated by a light source such that the scanner 102 is able to scan the enhanced-density barcode 104 through the component for low pass filtering 108 and the component for distorting 106. After the enhanced-density barcode 104 has been distorted in a first direction by means of the component for distorting 106 and has been low pass filtered by the component 108, the scanner 102 reads the resulting image. For the first distortion direction, this image is the first barcode 116 and for the second distortion direction this image is the second barcode 118. The low pass filtering of the distorted barcodes results in a color averaging of the sub-pixels of a block. The reconstruction of the first barcode 116 and the second barcode 118 includes determining of block boundaries of the blocks. This is done by, for example, a module 114 included in the memory 112 which analyzes the image scanned by the scanner 102 and determines block boundaries such that an accurate reconstruction of the first and the second barcodes 116 and 118 can be performed. For example, the block boundaries are determined by the module 114 by analyzing special alignment patterns included in the image scanned by the scanner 102.

Even though according to the example as illustrated with reference to FIG. 1 the distortion component 106 and the low pass filtering component 108 are analogue optical components like lenses, low pass filtering and distortion can also be performed within the data processing system 100. According to such an embodiment of the invention the scanner 102 is provided with a sufficient high resolution to resolve the individual sub-pixels of the enhanced-density barcode 104.

Figure 2:
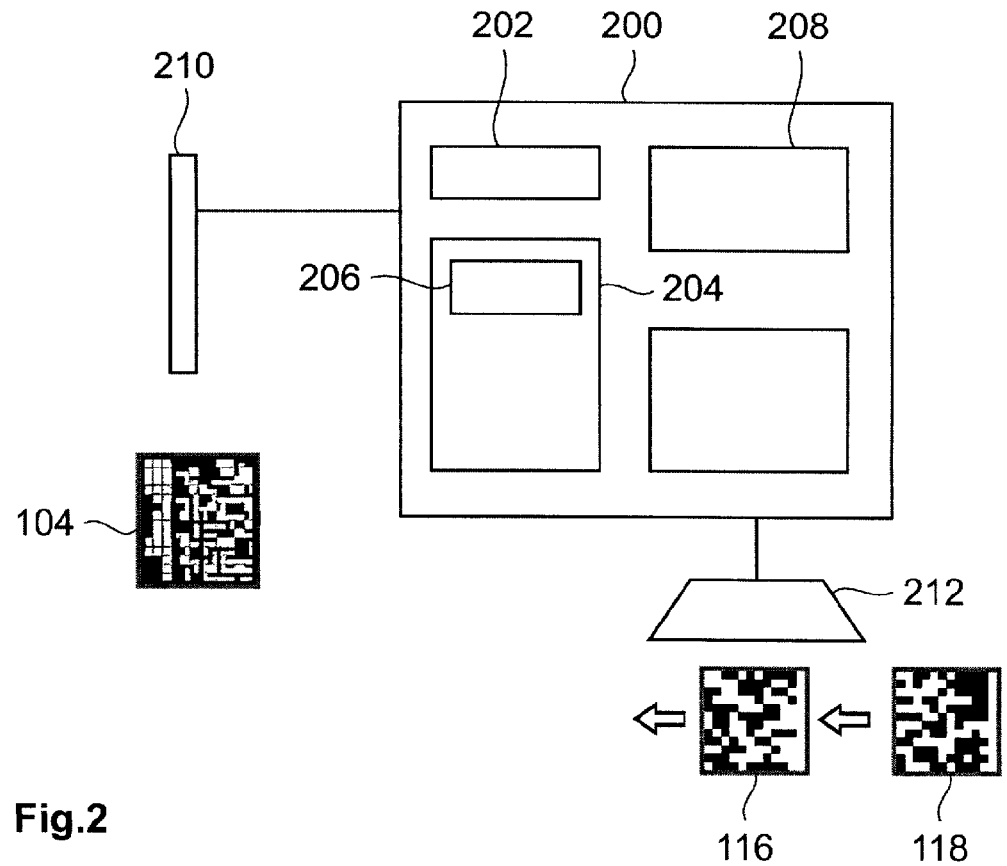
FIG. 2: is a block diagram of a barcode writer.

FIG. 2 is a block diagram of a barcode writer. The barcode writer includes a data processing system 200 which includes a processor 202 and a memory 204. By means of an interface 208, an image scanner 212 is connected to the data processing system 200. In operation, the image scanner 212 scans, for example, a first barcode 116 and a second barcode 118. By means of a module 206, the first and the second barcode 116 and 118 are encoded into a two-dimensional enhanced-density barcode which is then written by means of a writer 210 onto a surface, like an identity card. For example, the writer 210 may be a laser writer.

Figure 3:
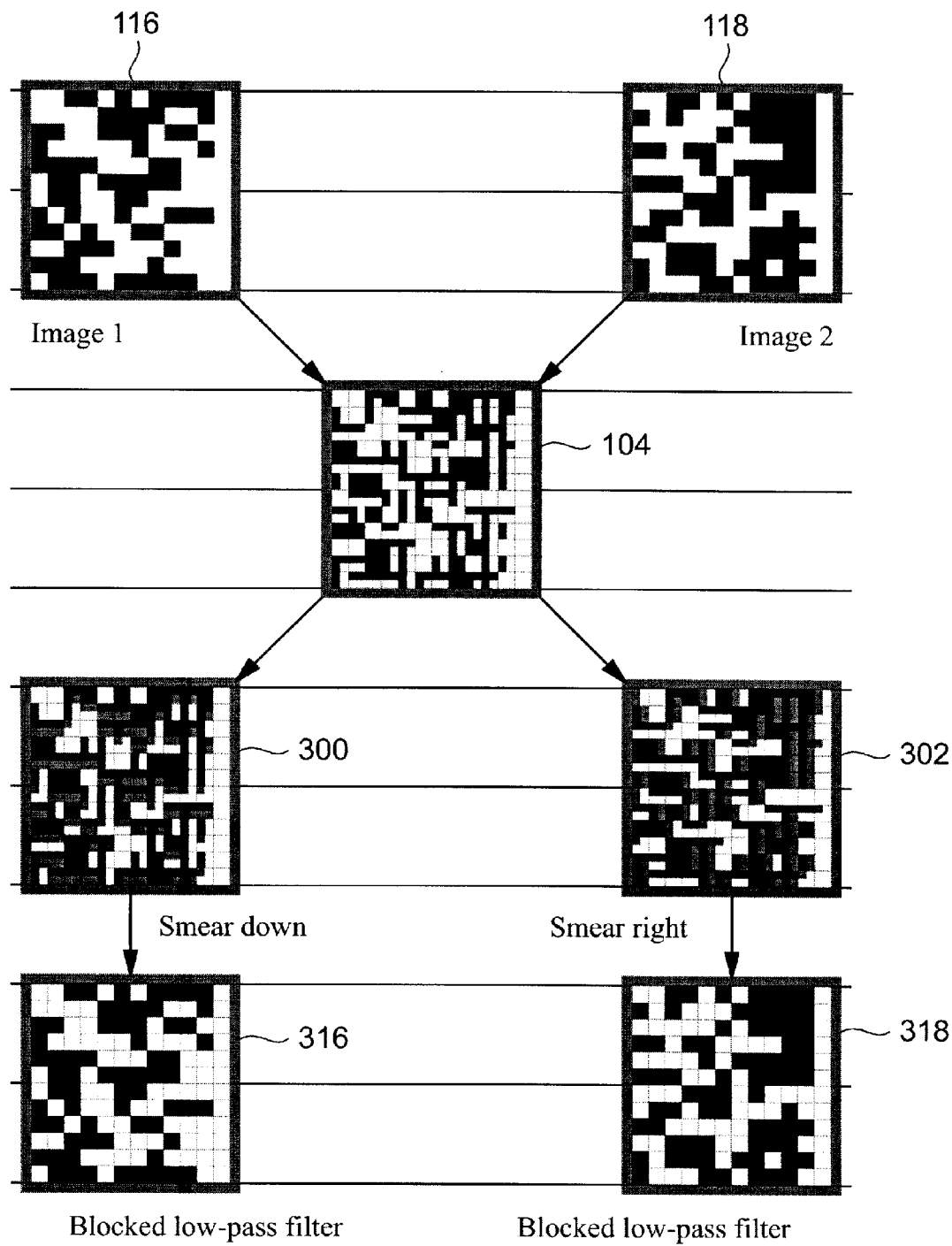
FIG. 3: is a schematic illustrating an embodiment of the encoding and decoding process according to the invention.

FIG. 3 is a schematic illustrating an embodiment of the encoding and decoding process according to the invention. The first barcode 116 and the second barcode 118 are combined to an enhanced-density barcode 104. By applying anisotropic filtering, for example by means of a birefringent lens, a "smeared down" image 300 is generated. By changing the anisotropy direction of the filtering by 90 degrees, a "smeared right" image 302 is obtained. The smeared down image 300 and the smeared right image 302 contain areas with different shadings. In order to convert these shadings to a single black or white value, a low pass filter is applied to each the smeared down image 300 and the smeared right image 302. In case of the smeared down image 300, a barcode 316 is obtained which corresponds to the originally encoded first barcode 116. The same holds for the smeared right image 302 which, upon low pass filtering, is transformed into a barcode 318 which corresponds to the original second barcode 118.

Figure 4:
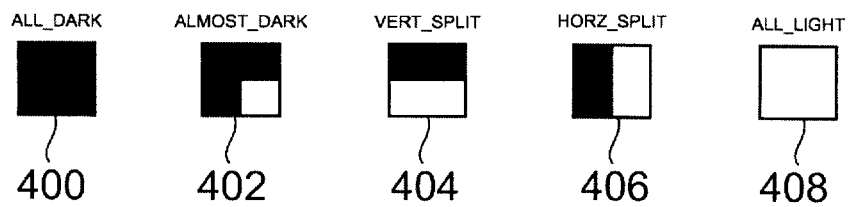
FIG. 4: is a schematic illustrating a symbol set used to perform an encoding process.
Figure 4:
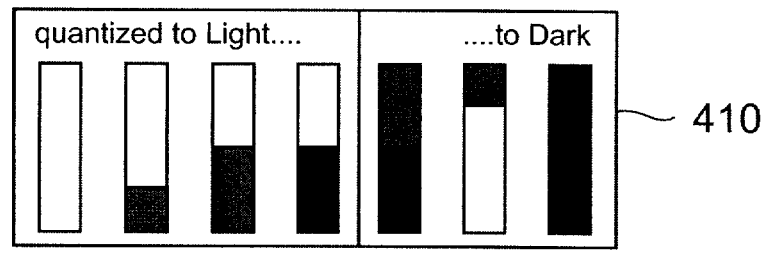

FIG. 4 is a schematic illustrating a symbol set used to perform an encoding process. In the following, for the case of simplicity, it is assumed that the first and the second direction in which the distortion process is performed are perpendicular to each other. Further, without loss of generality, it is assumed that input images have the same dimensions so that pixel grids of input images can be overlaid exactly. The input images represent the first barcode 116 and the second barcode 118 that are used as input to encode them into the enhanced-density barcode 104. In order to encode the first 116 and the second 118 barcode in the enhanced-density barcode 104, a pair wise encoding of pixel pairs of the first 116 and the second 118 barcode is performed according to a predefined encoding scheme. The predefined encoding scheme allocates to each combination of pixel pairs a predefined block comprising a predefined number of sub-pixels. Such a pixel pair consists of a pixel of the first barcode 116 and a corresponding pixel of the second barcode 118. Each pixel pair of the first barcode 116 and the second barcode 118, also denoted as pair of input pixels, is mapped on a predefined block including a predefined number of sub-pixels. In this example, each pair of input pixels is mapped on a block that consists of four sub-pixels. The sub-pixels are subdivisions of a block. The blocks and the sub-pixels have in this example the form of a square. By this mapping process, an array of n×m blocks is generated if input images, i.e. the first barcode 116 and the second barcode 118, are n pixels wide and m pixels high. Each block corresponds to a pair of input pixels.

Since each block is defined in terms of four sub-pixels, $2^4$ possible variations of four sub-pixels exist. However, according to a preferred embodiment of the invention only five variations of these sub-pixels in a block are used for encoding any pair of input pixels. These blocks are shown as 'symbols' 400, 402, 404, 406 and 408.

The distortion of the enhanced-density barcode 104 including the blocks 400-408 extends dark sub-pixels by a lower intensity, one sub-pixel wide grey region which intrudes upon neighboring light pixels in the smearing direction.

For example the 'all light block' 408 contains four light or white sub-pixels, wherein the 'all light block' is immune to smearing from top or from the left. As it may have up to two sub-pixels turned into grey which result from a smearing of dark sub-pixels adjacent to the block 408, low-pass filtering always reconstructs the block 408 into a light pixel. As an 'all light block' contains no dark sub-pixels, it may not influence its right or lower neighbor during the distortion process.

The contrast to the 'all light block' 408 is the 'all dark block' 400. The 'all dark block' 400 consists of four dark sub-pixels, which remain unconditionally dark upon filtering. The 'all dark block' 400 is immune to smearing and distortion, as its sub-pixels may not be further darkened. Nevertheless, the 'all dark block' 400 smears grey sub-pixels onto its neighbors in both perpendicular smearing directions.

The 'almost dark block' 402 contains a single light sub-pixel in the lower right area. The block 402 remains unconditionally dark during low pass filtering. Nevertheless, it may influence one sub-pixel of a neighbor it smears onto. Since an 'almost dark block' 402 contains dark pixels in its top and left halves, it is itself immune to smearing and can obviously not be further darkened.

The 'vertically split block' 404 contains a row of dark sub-pixels above light ones. With 50% dark sub-pixels, the low pass filter turns the original block into a light pixel. When smearing down, the lower row of sub-pixels turns grey, crossing the predefined threshold and the low pass filter maps the block into a dark pixel.

The same principle holds for the 'horizontally split block' 406. The 'horizontally split block' 406 combines a dark column of sub-pixels on the left with a light column on the right. This means that left/right smearing darkens sub-pixels in the right column, tilting the sub-pixel balance to dark. Top-down smearing preserves the 50% dark sub-pixel ratio, allowing a low pass filter for example to restore the complete block to light, depending on the thresholds of the low pass filter.

The sub-pixel distribution overview 410 illustrates how possible color distributions of blocks in the symbol set of the symbols 400-408 are either quantized to light or to dark, depending on the threshold. In the example of the sub-pixel distributions 410, the low pass filtering has a threshold of 50%, wherein a grey color value of 50% darkness or below 50% darkness is quantized to light and above this threshold is quantized to dark.

Figure 5:
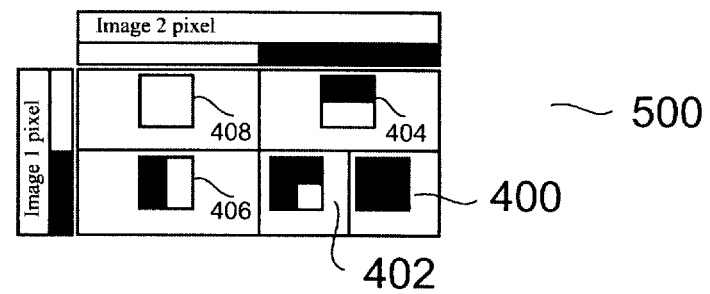
FIG. 5: is a schematic illustrating a smearing process of various symbols.
Figure 5:
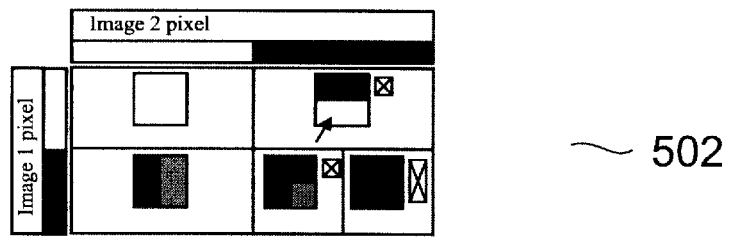
Figure 5:
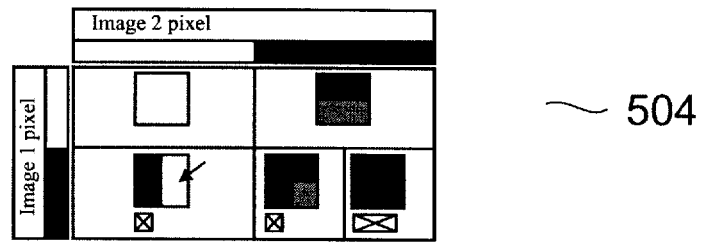

In FIG. 5, the reference numeral 500 indicates how blocks according to an encoding scheme of an embodiment of the invention are selected based on the possible pixel combinations of a pair of input pixels of the first barcode 116 and the second barcode 118 using the symbols 400-408. The only multiple choice combination is a dark/dark pair with the symbols 402 and 400.

The reference numeral 502 indicates how left/right distortion alters the blocks. Sub-pixels in grey are darkened within the block in question. Separate grey areas, highlighted by crossing, are sub-pixel impacted outside this block, i.e. within its right neighbor. Obviously, the two blocks in the top table row remain light due to retaining two or more light sub-pixels, while the three in the lower row remain or are turned into dark after low pass filtering. The block smearing illustration 502 also highlights the requirement of the 'horizontally split block' 406. In order to preserve its balance, its immediate left neighbor must not smear and darken its bottom left sub-pixel shown by the arrow. Out of the five blocks, only an all dark one would do this. Therefore if a dark/dark combination is needed in the block to the left, it should be encoded as 'almost dark'.

The reference numeral 504 shows the same effect for a top-down distortion. Grey sub-pixels are highlighted under the same rules and 'out of block' sub-pixels are within the block immediately below. Two blocks in the left table column remain light, both with two or more light sub-pixels and the other three blocks remain or are turned into dark.

Figure 6:
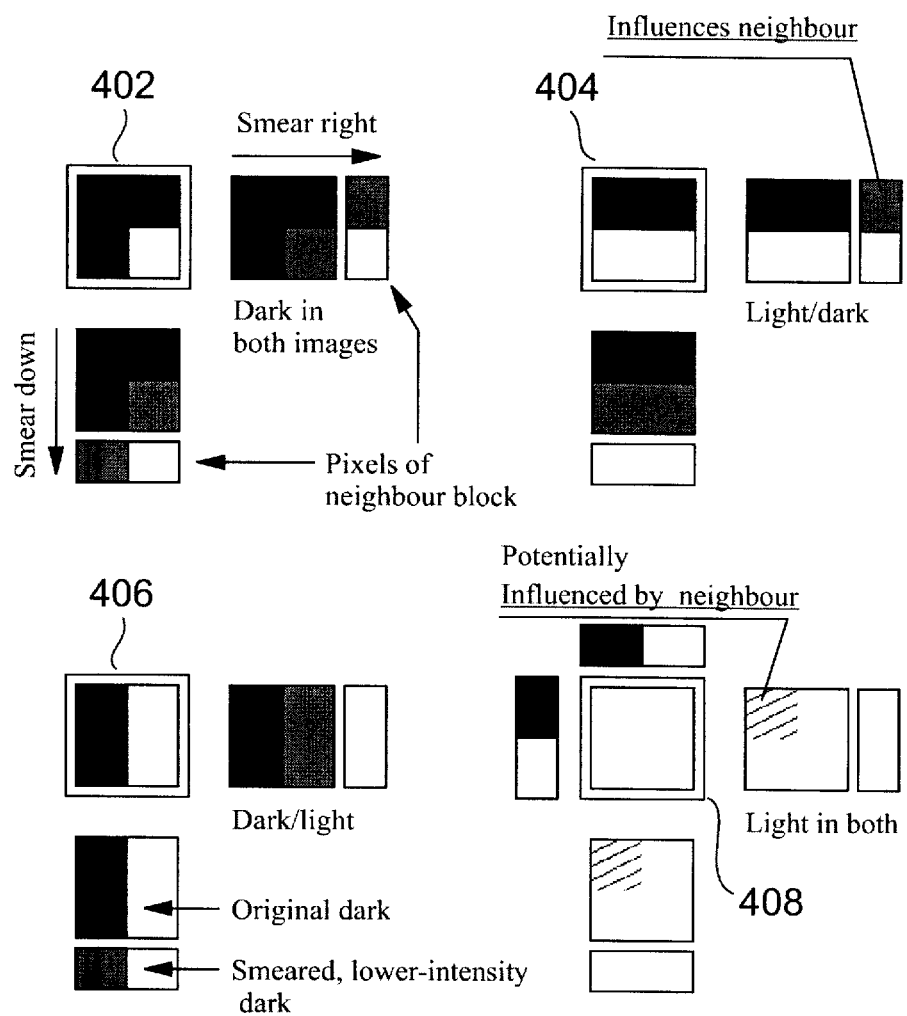
FIG. 6: is a schematic illustrating a block encoding and effects of smearing.

FIG. 6 is a schematic illustrating a block encoding and effects of smearing. With respect to FIG. 6, again the symbols 400-408 are used to encode two images of the first barcode and the second barcode respectively into one enhanced-density 2D barcode. Pixels dark in both images, i.e. dark pixel pairs, are encoded as a majority dark block. One corner is encoded as light to keep the 'all dark block' from smearing to neighbors. As smearing cannot lighten, just darken pixels, a majority dark block always gets filtered to a dark pixel during decoding.

Similarly, light pixel pairs, i.e. pixel pairs consisting of a light pixel in the first barcode and a light pixel in the second barcode, are encoded as an 'all light block'. Note that an all light block, also denoted as all white block, may be influenced by smearing from its immediate neighbors. However, as the darkness filter threshold requires a majority of dark, an all white block is always restored to a light pixel after low pass block filtering. Pixels light after horizontal smearing and dark after top-down smearing are encoded as a horizontal stripe, two dark sub-pixels over two light ones.

Horizontal smearing does not change block darkness which stays light since a majority of dark sub-pixels is needed to turn a block to dark. Downwards smearing darkens lower, light sub-pixels and darkens the entire block during low pass filtering. Conversely, dark/light blocks are encoded as horizontal stripes, smeared horizontally to dark, and remain light otherwise.

In the case of the symbol 404 it is turned into a light block after smearing to the right and low pass-filtering. For the case of smearing down and low pass filtering of the symbol 404, due to the presence of the black horizontal bar (consisting of two dark sub-pixels) and the grey horizontal bar, the average color value of this block is above the threshold, so that in case of smearing down and subsequent low pass filtering the symbol 404 is turned into a dark block.

With respect to the symbol 408 in FIG. 6 it is further illustrated how a neighboring block can influence the symbol 408, for example, for the smearing to the right it is assumed that left to the symbol 408 a further block is located which in its upper half has a dark bar of two dark sub-pixels. Due to the smearing to the right, the dark bar of the neighbor of the symbol 408 influences the symbol when smeared to the right. This is indicated by the shading.

The same holds for a smear down situation, however, in this case with a further bar located above the symbol 408. In this case, smearing down will generate a smearing of the dark bar into the symbol 408, which is indicated as a shading in the block below the symbol 408. Nevertheless, in both cases, low pass filtering will yield a complete light block since the area indicated by the shading within the smeared symbol 408 is not sufficient to provide an average color value which is above the threshold for turning the symbol into a dark block.

Sub-pixel patterns are selected to produce the calculated anisotropic effect when filtered through simple analogue filters. In the implementation examples, sub-pixel axes are aligned parallel to main directions of scanning equipment and anisotropic filtering in two perpendicular directions (parallel to barcode axis) results in two noticeably different images.

Note that the proposed sub-pixel resolution barcodes may not be valid individually, but low pass filtering transforms them into valid lower resolution barcodes by construction. This means that it is possible to rely on scanning equipment reconstructing different binary content reliably from the reconstructed images, using standard decoding techniques. Decoding assumes, without loss of generality that the orientation of a 2D enhanced-density barcode may be ambiguously determined.

Anisotropic image manipulation, called 'smearing' which is spreading of dark sub-pixels across lighter ones, is used to transform the enhanced-density barcode selectively. The sample encoding applies left to right and downwards smearing, which naturally corresponds to the scanning process. The sample sub-pixel encoding presented above has the advantage that a block appears dark when smeared in one direction and remains light when smeared into a perpendicular direction.

What is claimed is:

1. A method of encoding a two-dimensional enhanced-density barcode, the method comprising the steps of:
   receiving a first two-dimensional barcode and a second two-dimensional barcode wherein the first and the second two-dimensional barcodes include pixels of a predefined pixel density;
   performing a pair wise encoding of pixel pairs of the first and the second two-dimensional barcodes according to a predefined encoding scheme carried out by overlaying said first two dimensional barcode and said second two-dimensional barcode and allocating each combination of pixel pairs to a predefined block that includes a predefined number of sub-pixels, each of said pixel pairs comprising a given pixel of said first two-dimensional barcode and a corresponding pixel of said second two-dimensional barcode; and
   arranging the blocks of the enhanced-density barcode relative to each other in a geometrical lattice wherein the lattice has a first and a second lattice direction, thereby producing the encoded two-dimensional enhanced-density barcode.

2. A two-dimensional enhanced-density barcode encoded by the method of claim 1.

3. The two-dimensional enhanced-density barcode according to claim 2, wherein sub-pixel density of the two-dimensional enhanced-density barcode is four times higher than the pixel density of the first and the second two-dimensional barcodes, inasmuch as said predefined number of sub-pixels is four.

4. A barcode writer apparatus comprising:
   a memory;
   a processor, coupled to said memory; and
   an image scanner interface coupled to said processor;
   wherein said memory stores, in a non-transitory manner, program instructions which, when executed by said processor, cause said processor to be operative to:
      receive, from said image scanner interface, a first two-dimensional barcode and a second two-dimensional barcode wherein the first and the second two-dimensional barcodes include pixels of a predefined pixel density;
      perform a pair wise encoding of pixel pairs of the first and the second two-dimensional barcodes according to a predefined encoding scheme carried out by overlaying said first two dimensional barcode and said second two-dimensional barcode and allocating each combination of pixel pairs to a predefined block that includes a predefined number of sub-pixels, each of said pixel pairs comprising a given pixel of said first two-dimensional barcode and a corresponding pixel of said second two-dimensional barcode;

arrange the blocks of the enhanced-density barcode relative to each other in a geometrical lattice wherein the lattice has a first and a second lattice direction, thereby producing the encoded two-dimensional enhanced-density barcode; and send instructions to a writer to write said encoded two-dimensional enhanced-density barcode on a surface.

* * * * *